(12) United States Patent
Caverly

(10) Patent No.: US 8,858,232 B2
(45) Date of Patent: Oct. 14, 2014

(54) DEVICE TO THREE-DIMENSIONALLY DISPLAY COLORS OF A COLOR MODEL

(76) Inventor: Heather H. Caverly, Northville, MI (US)

( * ) Notice: Subject to any disclaimer, the term of this patent is extended or adjusted under 35 U.S.C. 154(b) by 355 days.

(21) Appl. No.: 13/252,546

(22) Filed: Oct. 4, 2011

(65) Prior Publication Data

US 2013/0084548 A1   Apr. 4, 2013

(51) Int. Cl.
*G09B 19/00* (2006.01)
*G09B 11/00* (2006.01)
*A63H 33/16* (2006.01)
*G09F 1/06* (2006.01)

(52) U.S. Cl.
CPC .................. *G09B 19/0023* (2013.01)
USPC ............. 434/98; 434/81; 446/488; 40/124.14

(58) Field of Classification Search
USPC ........... 434/98, 81; 40/124.14, 539; 446/108, 446/109, 487, 488; 273/155; D20/40, 99; D19/35, 99
See application file for complete search history.

(56) References Cited

U.S. PATENT DOCUMENTS

| 3,296,755 | A | * | 1/1967 | Chisholm | ...................... 52/81.4 |
| 3,668,796 | A | | 6/1972 | Patterson | |
| 4,380,133 | A | * | 4/1983 | Arnstein | ....................... 446/488 |
| 4,796,888 | A | * | 1/1989 | Louez | ........................... 446/243 |
| 4,966,461 | A | | 10/1990 | Hooper | |
| 5,592,598 | A | * | 1/1997 | Yamrom | ....................... 345/423 |
| 6,921,314 | B2 | * | 7/2005 | Miller | ............................. 446/85 |

\* cited by examiner

*Primary Examiner* — Sam Yao
*Assistant Examiner* — Peter J Alley
(74) *Attorney, Agent, or Firm* — Brooks Kushman P.C.

(57) ABSTRACT

A device to three-dimensionally display colors of a color model is provided. The device includes a plurality of interconnected top panels. The top panels are arranged in a circle about a central axis to display primary, secondary and tertiary colors of the color model in a predetermined spatial relationship at the top surface of the device. The device further includes a plurality of interconnected side and bottom panels. Left and right surfaces of the side panels, the lower surfaces of the top panels and the upper surfaces of the bottom panels form the side surfaces of the device and display the primary, secondary and tertiary colors of the color model at the side surfaces.

17 Claims, 5 Drawing Sheets

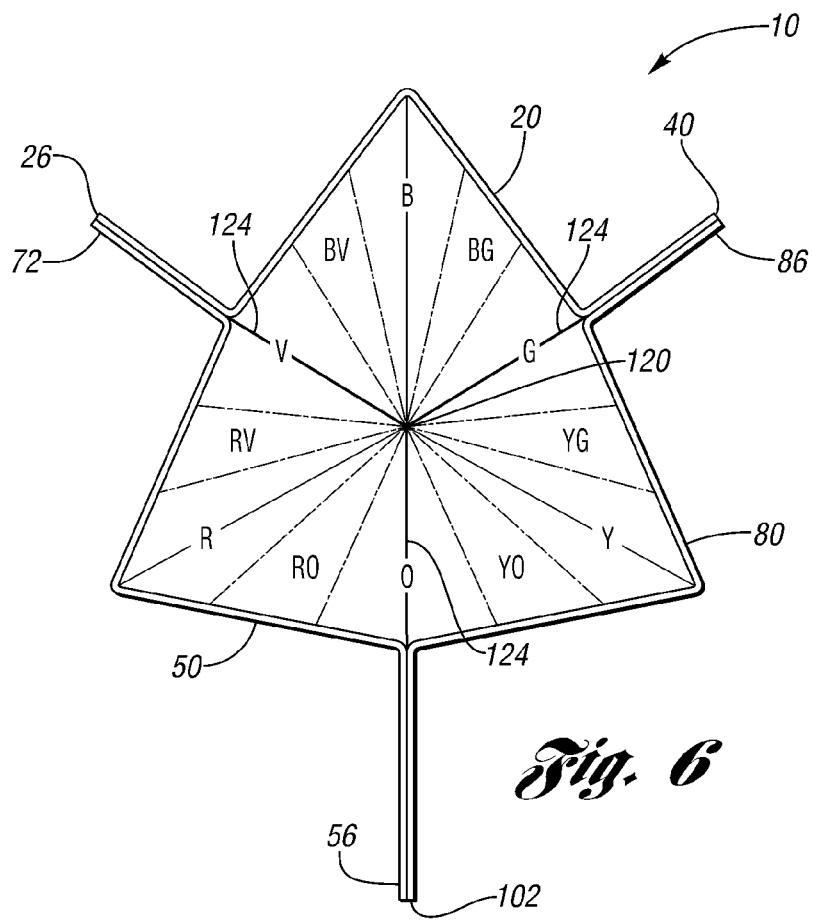
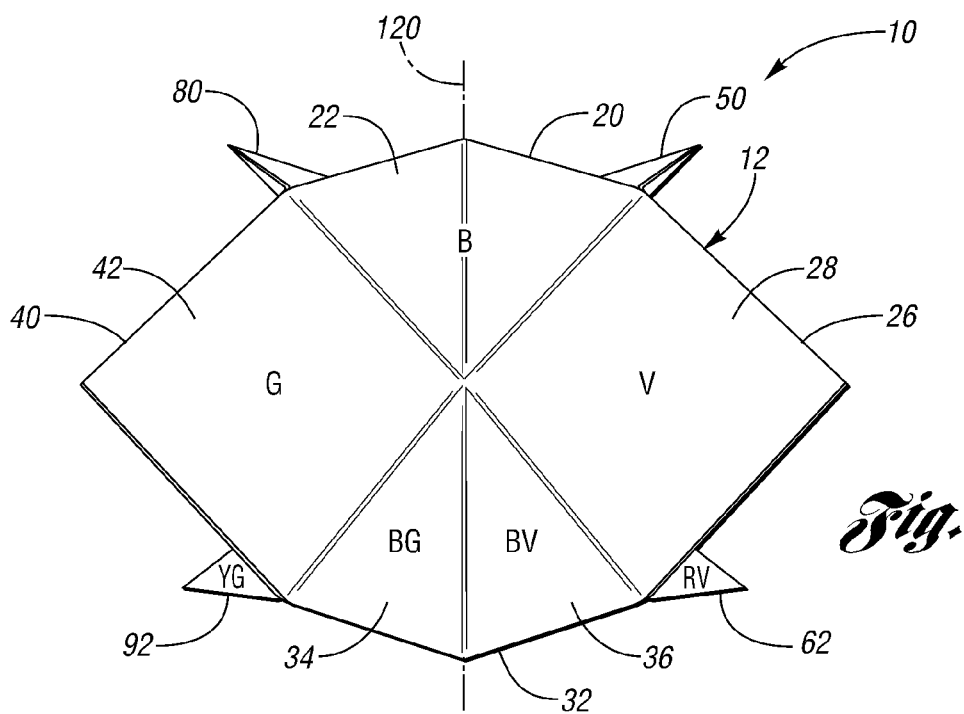

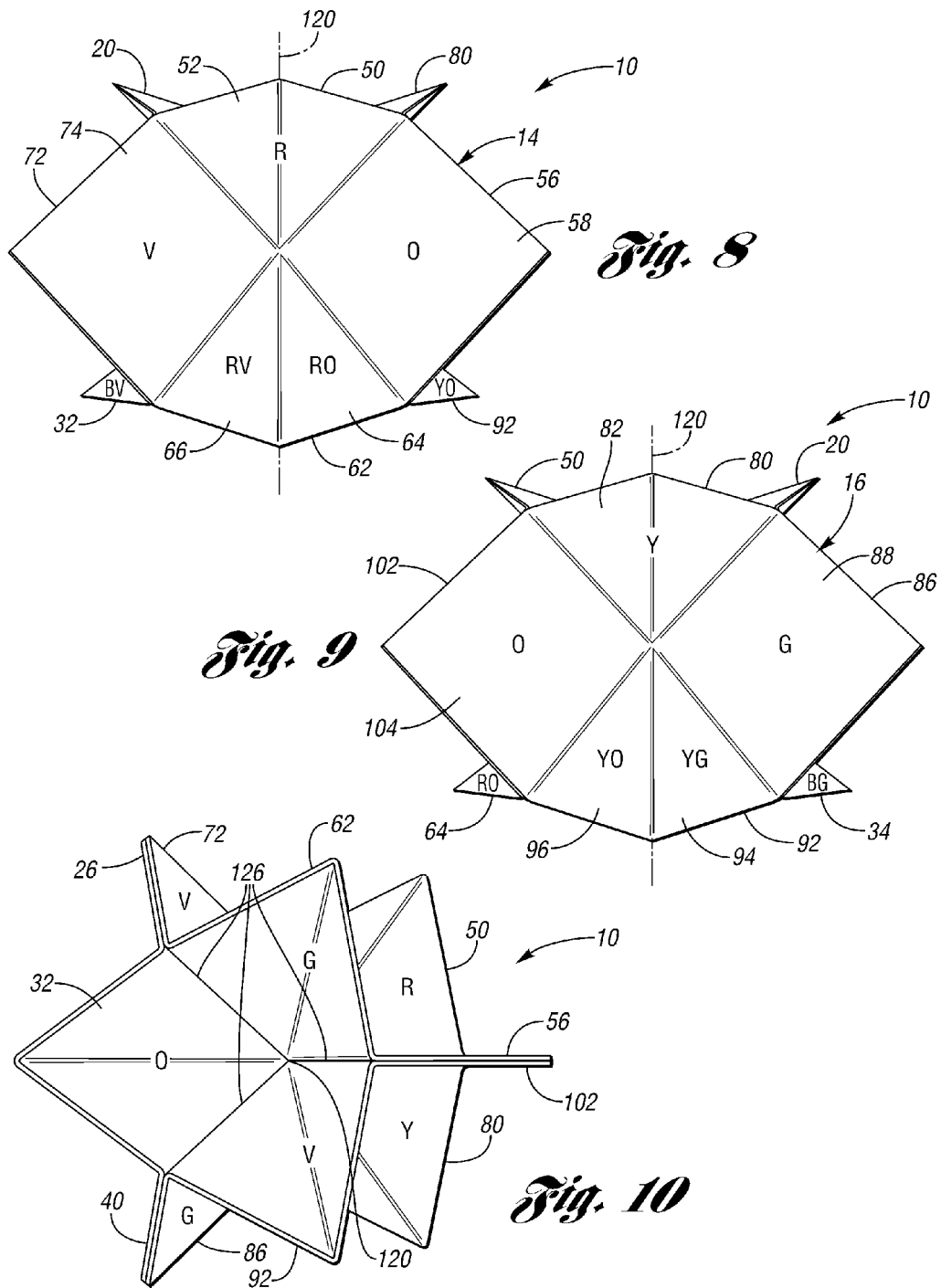

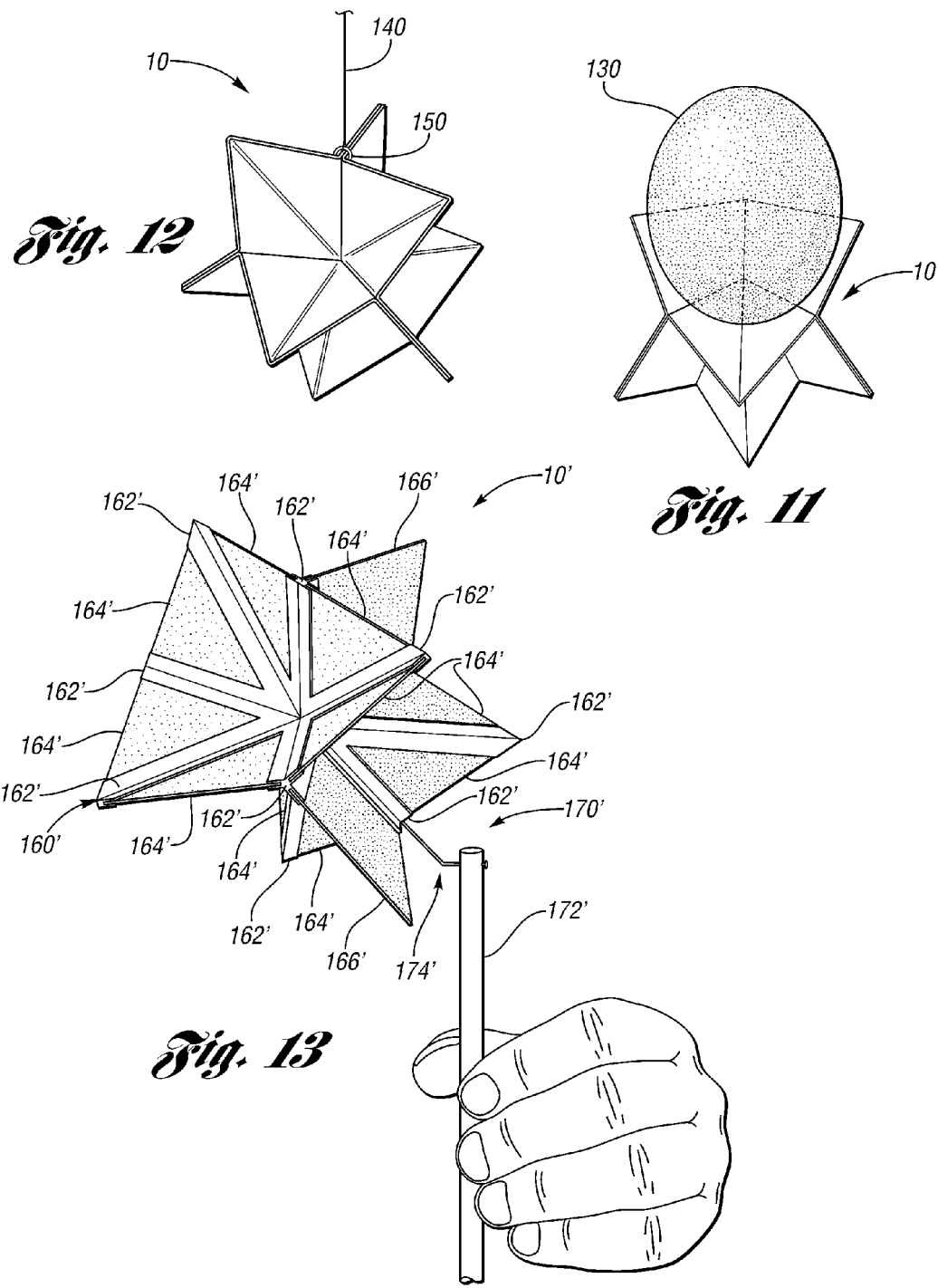

DEVICE TO THREE-DIMENSIONALLY DISPLAY COLORS OF A COLOR MODEL

TECHNICAL FIELD

This invention relates generally to devices which display colors and, in particular, to devices which three-dimensionally display colors of a color model.

OVERVIEW

A color wheel has been defined as an abstract illustrative organization of color hues around a circle, that shows relationships between primary colors, secondary colors, complementary colors, etc.

A color wheel has also been defined as a mechanical device that has an array of colors arranged as petals or gradients around an axis. Most color wheels are based on three primary colors, three secondary colors, and six intermediate or tertiary colors formed by mixing a primary with a secondary for a total of 12 main divisions.

A typical artist's paint or pigment color wheel includes the blue (B), red (R), and yellow (Y) primary colors. The corresponding secondary colors are green (G), orange (O), and violet (V). The tertiary colors are red-orange (RO), red-violet (RV), yellow-orange (YO), yellow-green (YG), blue-violet (BV), and blue-green (BG). The red, yellow, and blue primaries (RYB color model) are arranged at three equally spaced points around their color wheel.

Printers and others who use modern subtractive color methods and terminology use magenta, yellow, and cyan as subtractive primaries. Intermediate and interior points of color wheels and circles represent color mixtures.

U.S. Pat. No. 3,668,796 discloses a greeting card that folds flat for mailing, and can be folded into a three-dimensional ornament or point of purchase display for decorative purposes, if desired, by having the card formed into prescored panels. After the card has been received it can be easily folded and assembled into its ornamental form.

U.S. Pat. No. 4,796,888 discloses a hue sequence device comprising a sphere, sphereoid or polyhedron. The surface of the device is divided into a plurality of differently colored areas with the sum of the areas constituting the surface of the item. The size and shape of all the areas is approximately the same and the color of any one area and the color of the adjacent areas are spectrally related having an angular spacing on the color wheel corresponding to the angular spacing between the normal to each of the areas passing through the center of the novelty item. Also, a color mapping method from the two dimensional color wheel to a three dimensional color wheel is disclosed.

U.S. Pat. No. 4,966,461 discloses a hue compass which has triplet numerical values assigned to colors so that every possible color is identified with a unique triplet color identification number which represents the percentages of each primary color component present.

SUMMARY OF EXAMPLE EMBODIMENTS

An object of the present invention is to provide a device to three-dimensionally display colors of a color model. In at least one embodiment, the device has an extended, open position to display the colors and a folded closed position to form a book-like structure having hingedly connected colored panels disposed between protective cover panels.

In carrying out the above object and other objects of the present invention, a device to three-dimensionally display colors of a color model is provided. The device includes a plurality of interconnected top panels which have upper and lower surfaces. The upper surfaces form a top surface of the device and the lower surfaces partially form side surfaces of the device. The top panels display the colors of the color model including primary, secondary and tertiary colors at the top surface of the device. The top panels are arranged in a circle about a central axis to display the primary, secondary and tertiary colors in a predetermined spatial relationship at the top surface of the device. The device further includes a plurality of interconnected bottom panels which have upper and lower surfaces. The lower surfaces of the bottom panels form a bottom surface of the device and the upper surfaces of the bottom panels partially form the side surfaces of the device. The lower surfaces of the bottom panels display a first set of colors of the color model and the lower surfaces of the top panels display a second set of colors which are complementary to the first set of colors in a spaced overlapping relationship to their respective complementary colors of the first set. The device still further includes a plurality of interconnected side panels which have left and right surfaces and extend between the top and bottom panels. The left and right surfaces of the side panels, the lower surfaces of the top panels and the upper surfaces of the bottom panels form the side surfaces of the device and display the primary, secondary and tertiary colors of the color model at the side surfaces. The top, side and bottom panels are arranged about the central axis to display the primary, secondary and tertiary colors in a three-dimensional spatial relationship at the side surfaces of the device.

Each of the side surfaces may display primary, secondary and tertiary colors of the color model.

The panels may be made of material comprising at least one of paper, plastic, fabric, fiber, metal, wire, wood, resins, plaster, cement and ceramic.

Adjacent panels may be hingedly connected together.

Adjacent panels may be bonded together.

The device may further include a skeletal frame structure including a plurality of interconnected panel supports to interconnect and support the panels.

The device may further include an apparatus having a base portion and a support portion to rotatably support the skeletal frame structure.

The color model may be a red/blue/yellow color model.

Each of the side panels may display the same color at its left and right surfaces.

Each of the side surfaces may be generally concave.

Further in carrying out the above object and other objects of the present invention, a foldable device to three-dimensionally display colors of a color model is provided. The device includes a plurality of hingedly connected top panels which have upper and lower surfaces. The upper surfaces form a top surface of the device and the lower surfaces partially form side surfaces of the device. The top panels display the colors of the color model including primary, secondary and tertiary colors at the top surface of the device. The top panels are arranged in a circle about a central axis to display the primary, secondary and tertiary colors in a predetermined spatial relationship at the top surface of the device. The device further includes a plurality of hingedly connected bottom panels which have upper and lower surfaces. The lower surfaces of the bottom panels form a bottom surface of the device and the upper surfaces of the bottom panels partially form the side surfaces of the device. The lower surfaces of the bottom panels display a first set of colors of the color model and the lower surfaces of the top panels display a second set of colors which are complementary to the first set of colors in a spaced overlapping relationship to their respective complementary colors of the first set. The device still further includes a plurality of hingedly connected side panels which have left and right surfaces and extend between the top and bottom panels. The left and right surfaces of the side panels, the lower surfaces of the top panels and the upper surfaces of the bottom panels form the side surfaces of the device and display the primary, secondary and tertiary colors of the color model at the side surfaces. The top, side and bottom panels are arranged about the central axis to display the primary, secondary and tertiary colors in a three-dimensional spatial relationship at the side surfaces of the device. The device has an extended, unfolded open position to display the colors and a folded, closed position to form a book-like structure having colored panels disposed between protective cover panels.

Adjacent top panels may be hingedly connected together by elongated hinges which extend along axes having a common point of intersection on the central axis which corresponds to a corner of the book-like structure.

Adjacent bottom panels may be hingedly connected together by elongated hinges which extend along axes having a common point of intersection on the central axis which corresponds to a corner of the book-like structure.

Adjacent top and side panels may be hingedly connected together by elongated hinges which extend along axes having a common point of intersection on the central axis which corresponds to a corner of the book-like structure.

Still further in carrying out the above object and other objects of the present invention, a device to three-dimensionally display colors of a color model is provided. The device includes a plurality of interconnected top panels which have upper and lower surfaces. The upper surfaces form a top surface of the device and the lower surfaces partially form side surfaces of the device. The device further includes a plurality of interconnected bottom panels which have upper and lower surfaces. The lower surfaces of the bottom panels form a bottom surface of the device and the upper surfaces of the bottom panels partially form side surfaces of the device. The device still further includes a plurality of interconnected side panels which have left and right surfaces and extend between the top and bottom panels. The left and right surfaces of the side panels, the lower surfaces of the top panels and the upper surfaces of the bottom panels form the side surfaces of the device and display primary, secondary and tertiary colors of a color model at the side surfaces. The top, side and bottom panels are arranged about a central axis to display the primary, secondary and tertiary colors in a three-dimensional spatial relationship at the side surfaces of the device.

The device may be foldable and the device may have an extended, unfolded open position to display the colors and a folded closed position to form a book-like structure having hingedly connected colored panels disposed between protective cover panels.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 6 is a top plan view of the device of FIG. 5;

FIG. 7 is a first side view of the device of FIG. 5;

FIG. 8 is a second side view of the device of FIG. 5;

FIG. 9 is a third side view of the device of FIG. 5;

FIG. 10 is another bottom perspective view of the device of FIG. 5 and showing different complementary colors;

FIG. 11 is a top perspective view of the device of FIG. 5 supporting an object;

FIG. 12 is a perspective view of the device of FIG. 5 hung from a thread in an ornamental fashion; and FIG. 13 is a top perspective view of a second embodiment of the device including a skeletal frame structure which supports the panels of the device and apparatus to rotatably support the structure so as to form a pinwheel-like structure.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
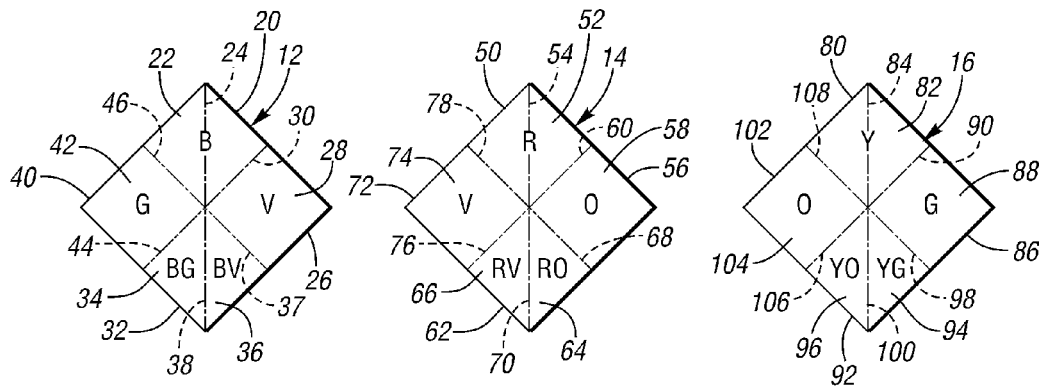
FIG. 1 is a top plan view of three square-shaped sheets, each of which includes four colored panels; when interconnected, the sheets form a device of at least one embodiment of the invention to three-dimensionally display colors of a color model.
Figure 2A:
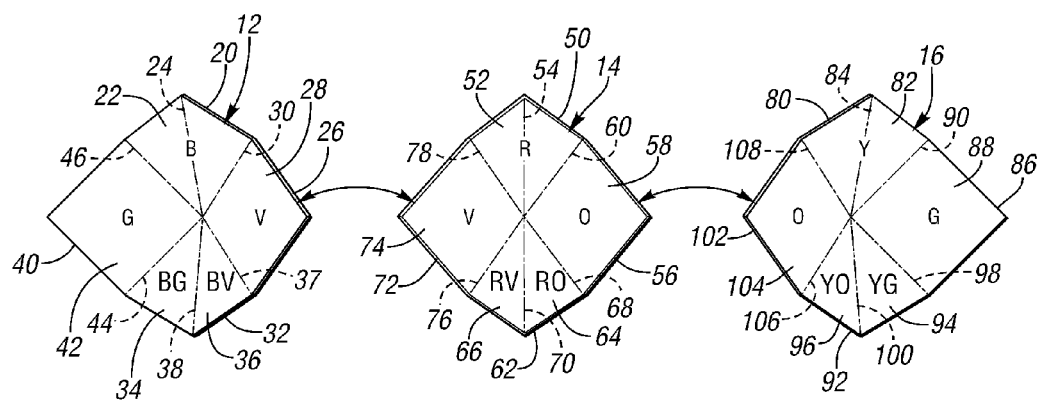
FIG. 2a is a view similar to the view of FIG. 1 but showing how the sheets are initially rotated and folded to form the device.
Figure 2B:
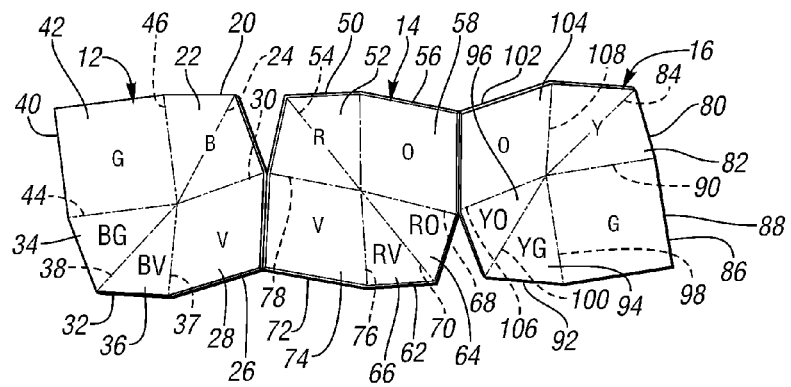
FIG. 2b is a view similar to the views of FIGS. 1 and 2a and showing how the panels having the same color are initially interconnected.

Referring to FIGS. 1, 2a and 2b, there are illustrated three square sheets, generally indicated at 12, 14 and 16, of material comprising at least one of paper, plastic, metal, wire, wood, resins, plaster, cement and ceramic which are colored to display various colors of a color model such as the RYB color mold. The sheet 12 includes a plurality of square-shaped panels including a blue (B) panel 22, a violet (V) panel 26, a panel 32 and a green (G) panel 40. The panel 22 has a B surface 22, is folded along a line 24 and is hingedly connected to the panel 26 having a V surface 28 at a fold line 30. In like fashion, the panel 26 is hingedly connected to the panel 32 at a hinge line or fold 37. In turn, the panel 32 includes a blue-green (BG) surface 34 and a blue-violet (BV) surface 36 separated by a fold line 38. The panel 32 is hingedly connected to the panel 40 having a G surface 42 at a fold line 44. The panel 40 is also hingedly connected to the panel 20 at a hinge line 46.

The sheet 14 also includes a plurality of square-shaped panels including a red (R) panel 50, an orange (O) panel 56, a panel 62 and a violet (V) panel 72. The panel 50 has a R surface 52, is folded at a line 54 and is hingedly connected to the panel 56 having an O surface 58 at a fold line 60. In like fashion, the panel 56 is hingedly connected to the panel 62 at a hinge line or fold 68. In turn, the panel 62 includes a red-violet (RV) surface 66 and a red-orange (RO) surface 64 separated by a fold line 70. The panel 62 is hingedly connected to the panel 72 having a V surface 74 at a fold line 76. The panel 72 is also hingedly connected to the panel 50 at a hinge line 78.

The sheet 16 includes a plurality of square-shaped panels including a yellow (Y) panel 80, a green (G) panel 86, a panel 92 and an orange (O) panel 102. The panel 80 has a Y surface 82, is folded at a line 84 and is hingedly connected to the panel 86 having a G surface 88 at a fold line 90. In like fashion, the panel 86 is hingedly connected to the panel 92 at a hinge line or fold 98. In turn, the panel 92 includes a yellow-orange (YO) surface 96 and a yellow-green (YG) surface 94 separated by a fold line 100. The panel 92 is hingedly connected to the panel 102 having an O surface 104 at a fold line 106. The panel 102 is also hingedly connected to the panel 80 at a hinge line 108.

Figure 3:
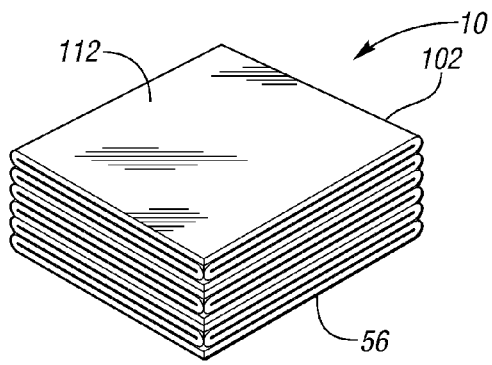
FIG. 3 is a perspective view of the device after the sheets of FIGS. 1, 2a and 2b are interconnected and folded, wherein the device is in its closed position to form a book-like structure.
Figure 4:
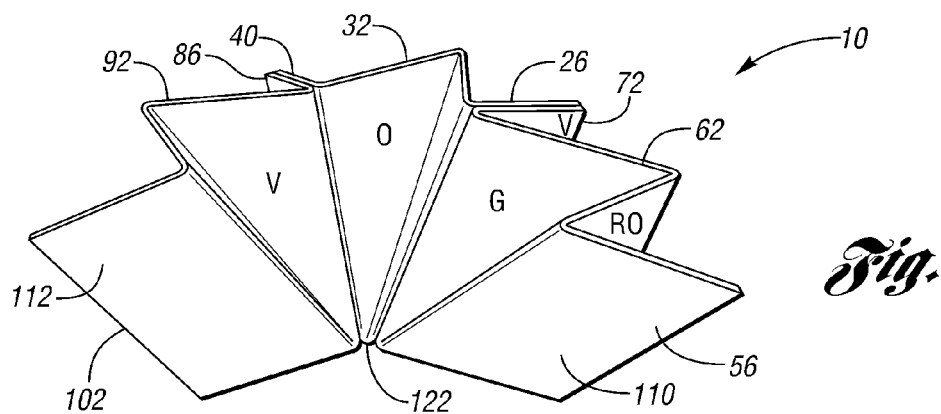
FIG. 4 is a perspective view of the device of FIG. 3 partially unfolded from the starting, closed position of FIG. 3.

As specifically shown in FIGS. 2b and 4, the violet (V) panels 26 and 72 are connected together at their back surfaces after folding, one over the other. The green (G) panels 40 and 86 are also connected together at their back surfaces after folding, one over the other. Finally, the orange (O) panels 56 and 102 are connected together at their back surfaces 110 and 112 by moving them between their positions in FIG. 4 to their positions in FIG. 5. The device 10 has an extended, open position in FIG. 5 to display the colors and a folded closed position to form the book-like structure of FIG. 3 which has hingedly connected colored panels disposed between protective cover panels 102 and 56.

Referring now to FIGS. 6-10, different views of the device 10 are shown with the device in its extended, open position. As previously mentioned, the device 10 three-dimensionally displays colors of a color model, such as the RYB color model. However, other colors of a different color model could also be displayed. The device 10 includes interconnected top panels 20, 80 and 50 having upper and lower surfaces. The upper surfaces forming a top surface of the device 10 and, as illustrated in FIGS. 7-9, the lower surfaces partially form side surfaces of the device 10. The top panels 20, 80 and 50 display the colors of the color model including primary (RYB), secondary (OVG) and tertiary (BG, YC, YO, RO, RV and BV) colors at the top surface of the device 10. The top panels 20, 80 and 50 are arranged in a circle about a central axis 120 to display the primary, secondary and tertiary colors in a predetermined spatial relationship at the top surface of the device 10.

Adjacent top panels (20, 50, 80) are hingedly connected together by elongated hinges 124 (FIG. 6) which extend along axes having a common point of intersection on the central axis 120 which correspond to a corner 122 (FIG. 4) of the book-like structure (FIG. 3).

Figure 5:
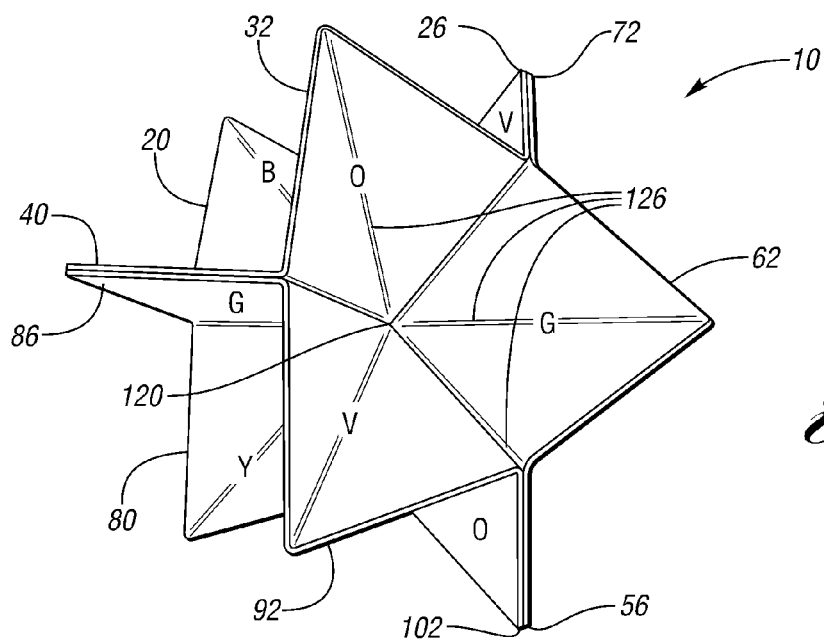
FIG. 5 is a bottom perspective view of the device of FIGS. 3 and 4 in its completely extended, open position and showing complementary colors.

Referring to FIGS. 5 and 10, the device 10 includes a plurality of interconnected bottom panels 32, 62 and 92 having upper and lower surfaces. The upper surfaces of the bottom panels 32, 62 and 92 partially form side surfaces of the device 10, as shown in FIGS. 7-9. The lower surfaces of the bottom panels 32, 62 and 92 display a first set of colors (O, G, V) of the color model and the lower surfaces of the top panels 20, 80 and 50 display a second set of colors (B, R, V) which are complementary to the first set of colors in a spaced overlapping relationship to their respective complementary colors of the first set, as best shown in FIGS. 5 and 10. Adjacent bottom panels 32, 62 and 92 (FIG. 10) are hingedly connected together by elongated hinges 126 which extend along axes having a common point of intersection on the central axis 120 which correspond to the corner 122 (FIG. 4) of the book-like structure (FIG. 3).

Referring to FIGS. 7-9, the device 10 includes a plurality of interconnected side panels 40, 86, 56, 102, 26 and 72 having left and right surfaces 42, 28, 74, 58, 104 and 88 and extending between the top and bottom panels. The left and right surfaces of the side panels, the lower surfaces of the top panels and the upper surfaces of the bottom panels form the side surfaces of the device 10 and display the primary, secondary and tertiary colors of the color model at the side surfaces. The top, side and bottom panels are arranged about the central axis 120 to display the primary, secondary and tertiary colors in a three-dimensional spatial relationship at the side surfaces of the device 10. Adjacent top and side panels 20, 50, 80 and 40, 86, 56, 102, 26, 72, respectively, are hingedly connected together by elongated hinges 124 (FIG. 6) which extend along axes having a common point of intersection on the central axis 120 which corresponds to the corner 122 of the book-like structure (FIG. 3). Each of the side panels displays the same color at its left and right surfaces. For example, side panels 40 and 86 display the green color at surfaces 42 and 88, respectively. Also, each of the side surfaces is generally concave.

Also, each of the side surfaces displays primary, secondary and tertiary colors of the color model. For example, referring to FIG. 7, the primary color blue (B) is displayed, the secondary colors green (G) and violet (V) are displayed and the corresponding tertiary colors, blue-green (BG) and blue-violet (BV), are displayed.

Referring now to FIG. 11, there is shown an embodiment of the device 10 supporting an object 130 at its upper surface. Panels of the device 10 are typically colored in the same fashion as the device of FIGS. 1-10.

Referring now to FIG. 12, there is shown an embodiment of the device 10 suspended by a thread or wire 140 which is attached to the device 10 by an annular, ring-shaped loop 150. Panels of the device 10 are typically colored in the same fashion as the devices of FIGS. 1-10.

Referring now to FIG. 13, there is shown another embodiment of the device 10, generally indicated at 10'. The device 10' comprises a skeletal frame structure, generally indicated at 160', which includes a plurality of interconnected panel supports 162' which support and interconnect triangular colored panels 164' and rectangular colored panels 166' of the device 10'. In turn, the structure 160' is rotatably supported on apparatus 170' including a base portion 172' and a support portion 174' to rotatably support the structure 160' to form a pinwheel-like structure which rotates in the wind. The base portion 172' may be adapted to be manually held or the base portion 172' may be a permanent or semi-permanent structure for outdoor use.

Much like in the first embodiment of the device 10, in the example embodiment of the device 10' of FIG. 13, each of the triangular-shaped upper panels 164' typically display one or more colors at its top surface while displaying a single primary color at its bottom surface. Each of the rectangular side panels typically displays a single secondary color on its left and right surfaces. Each of the triangular-shaped bottom panels typically displays tertiary colors at its top surface and colors complementary to the colors at the bottom surfaces of the top panels at the bottom surfaces of the bottom panels.

In various embodiments of the device the panels may be bonded to each other to make the device more permanent.

In summary, the devices 10 and 10' physically show the color wheel in three-dimensions. Some people may be better able to grasp the concept of colors and how they work together more easily this way. The devices invite the viewer/owner to interact with them in a fun physical way, while at the same time the devices are valuable teaching tools indicating how primary colors, when mixed together, produce secondary colors. In like fashion, a tertiary color is produced when a primary color is mixed with a secondary color.

As with a two-dimensional color wheel, complementary colors are typically found directly across from each other on the devices. When viewing the bottom of the three-dimensional color wheel device, the viewer will see complementary colors above and/or beneath one another.

Some embodiments of the device may be produced is a "pop-up" book form. The devices may be produced in multiple sizes. Varying from an overall size of one square inch in its closed position on up to an infinite number of sizes. The device 10 may be produced permanently open as a sculpture which can be suspended from a ceiling (i.e. FIG. 12) as a mobile/wind catcher and/or positioned on a pedestal or floor (i.e. FIG. 11) for display in an infinite number of sizes.

The three-dimensional color wheel book/sculpture device may be produced in multiple media such as various types of paper, fabric or fiber, plastic, metal, wire, wood, resins, plaster, cement, ceramic, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A device to three-dimensionally display colors of a color model, the device comprising:
    a plurality of interconnected top panels having viewable upper and lower surfaces, the upper surfaces forming a viewable top surface of the device and the lower surfaces partially forming viewable side surfaces of the device, the top panels being capable of displaying the colors of the color model including primary, secondary and tertiary colors at the viewable top surface of the device, wherein the top panels are arranged in a circle about a central axis and are capable of displaying the primary, secondary and tertiary colors in a predetermined spatial relationship at the viewable top surface of the device;
    a plurality of interconnected bottom panels having viewable upper and lower surfaces, the lower surfaces of the bottom panels forming a viewable bottom surface of the device and the upper surfaces of the bottom panels partially forming the viewable side surfaces of the device wherein the lower surfaces of the bottom panels are capable of displaying a first set of colors of the color model and the lower surfaces of the top panels are capable of displaying a second set of colors which are complementary to the first set of colors in a spaced overlapping relationship to their respective complementary colors of the first set; and
    a plurality of interconnected side panels having viewable left and right surfaces and extending between the top and bottom panels, wherein the left and right surfaces of the side panels, the lower surfaces of the top panels and the upper surfaces of the bottom panels form the viewable side surfaces of the device and are capable of displaying the primary, secondary and tertiary colors of the color model at the side surfaces, and wherein the top, side and bottom panels are arranged about the central axis and are capable of displaying the primary, secondary and tertiary colors in a three-dimensional spatial relationship at the viewable side surfaces of the device, the plurality of interconnected side panels further including a pair of back surfaces that face one another when the device is capable of displaying the colors in an open position, wherein rotation of the side panels relative to one another about the central axis transitions the device between the open position and a closed position in which the back surfaces face away from one another.

2. The device as claimed in claim 1, wherein each of the side surfaces displays primary, secondary and tertiary colors of the color model.

3. The device as claimed in claim 1, wherein the panels are made of material comprising at least one of paper, plastic, fabric, fiber, metal, wire, wood, resins, plaster, cement and ceramic.

4. The device as claimed in claim 1, wherein adjacent panels are hingedly connected together.

5. The device as claimed in claim 1, wherein the color model is a red/blue/yellow color model.

6. The device as claimed in claim 1, wherein each of the side panels displays the same color at its left and right surfaces.

7. The device as claimed in claim 1, wherein each of the side surfaces is generally concave.

8. A foldable device to three-dimensionally display colors of a color model, the device comprising:
    a plurality of hingedly connected top panels having viewable upper and lower surfaces, the upper surfaces forming a viewable top surface of the device and the lower surfaces partially forming viewable side surfaces of the device, the top panels being capable of displaying the colors of the color model including primary, secondary and tertiary colors at the viewable top surface of the device, wherein the top panels are arranged in a circle about a central axis and are capable of displaying the primary, secondary and tertiary colors in a predetermined spatial relationship at the viewable top surface of the device;
    a plurality of hingedly connected bottom panels having viewable upper and lower surfaces, the lower surfaces of the bottom panels forming a viewable bottom surface of the device and the upper surfaces of the bottom panels partially forming the viewable side surfaces of the device wherein the lower surfaces of the bottom panels are capable of displaying a first set of colors of the color model and the lower surfaces of the top panels are capable of displaying a second set of colors which are complementary to the first set of colors in a spaced overlapping relationship to their respective complementary colors of the first set; and
    a plurality of hingedly connected side panels having viewable left and right surfaces and extending between the top and bottom panels, wherein the left and right surfaces of the side panels, the lower surfaces of the top panels and the upper surfaces of the bottom panels form the viewable side surfaces of the device and are capable of displaying the primary, secondary and tertiary colors of the color model at the viewable side surfaces, wherein the top, side and bottom panels are arranged about the central axis and are capable of displaying the primary, secondary and tertiary colors in a three-dimensional spatial relationship at the viewable side surfaces of the device, and wherein the device has an extended, open position in which the colors are capable of being displayed at the viewable surfaces and a folded, closed position to form a book-like structure having panels disposed between protective cover panels, the plurality of side panels further including a pair of back surfaces that face toward one another when the device is in the open position and face away from one another when the device is in the closed position, wherein rotation of the side panels relative to one another about the central axis transitions the device between the open position and the closed position.

9. The device as claimed in claim 8, wherein each of the side surfaces displays primary, secondary and tertiary colors of the color model.

10. The device as claimed in claim 8, wherein the panels are made of material comprising at least one of paper, plastic, metal, wire, fabric, fiber, wood, resins, plaster, cement and ceramic.

11. The device as claimed in claim 8, wherein adjacent top panels are hingedly connected together by elongated hinges which extend along axes having a common point of intersection on the central axis which corresponds to a corner of the book-like structure.

12. The device as claimed in claim 8, wherein adjacent bottom panels are hingedly connected together by elongated hinges which extend along axes having a common point of intersection on the central axis which corresponds to a corner of the book-like structure.

13. The device as claimed in claim 8, wherein adjacent top and side panels are hingedly connected together by elongated hinges which extend along axes having a common point of intersection on the central axis which corresponds to a corner of the book-like structure.

14. The device as claimed in claim 8, wherein the color model is a red/blue/yellow color model.

15. The device as claimed in claim 8, wherein each of the side panels displays the same color at its left and right surfaces.

16. A device to three-dimensionally display colors of a color model, the device comprising:

a plurality of interconnected top panels having viewable upper and lower surfaces, the upper surfaces forming a viewable top surface of the device and the lower surfaces partially forming viewable side surfaces of the device;

a plurality of interconnected bottom panels having viewable upper and lower surfaces, the lower surfaces of the bottom panels forming a viewable bottom surface of the device and the upper surfaces of the bottom panels partially forming viewable side surfaces of the device; and a plurality of interconnected side panels having viewable left and right surfaces and extending between the top and bottom panels, wherein the left and right surfaces of the side panels, the lower surfaces of the top panels and the upper surfaces of the bottom panels form the viewable side surfaces of the device and are capable of displaying the primary, secondary and tertiary colors of the color model at the viewable side surfaces, and wherein the top, side and bottom panels are arranged about a central axis and are capable of displaying the primary, secondary and tertiary colors in a three-dimensional spatial relationship at the viewable side surfaces of the device, the plurality of interconnected side panels further including a pair of back surfaces that face one another when the device is capable of displaying the colors in an open position, wherein rotation of the side panels relative to one another about the central axis transitions the device between the open position and a closed position in which the back surfaces face away from one another.

17. The device as claimed in claim 16 wherein the device is foldable in a book-like structure having hingedly connected colored panels disposed between the back surfaces that serve as protective cover panels when the device is in the closed position.

\* \* \* \* \*